US012750341B2

(12) United States Patent
Radovnikovic et al.

(10) Patent No.: US 12,750,341 B2
(45) Date of Patent: Sep. 29, 2026

(54) MULTI-LAYER CHAINING OF WEB APPLICATION FIREWALLS

(71) Applicant: HAProxy Holdings, Inc., Wilmington, DE (US)

(72) Inventors: Dujko Radovnikovic, Waltham, MA (US); Nenad Merdanovic, Velika (HR); Vedran Furac, Rijeka (HR); Dragan Dosen, Zagreb (HR)

(73) Assignee: HAProxy Holdings, Inc, Wilmington, DE (US)

( * ) Notice: Subject to any disclaimer, the term of this patent is extended or adjusted under 35 U.S.C. 154(b) by 39 days.

(21) Appl. No.: 18/606,976

(22) Filed: Mar. 15, 2024

(65) Prior Publication Data

US 2025/0294011 A1 Sep. 18, 2025

(51) Int. Cl.
*H04L 9/40* (2022.01)
*H04L 67/02* (2022.01)

(52) U.S. Cl.
CPC .......... *H04L 63/0263* (2013.01); *H04L 63/02* (2013.01); *H04L 63/0227* (2013.01); *H04L 63/0281* (2013.01); *H04L 63/1408* (2013.01); *H04L 63/1425* (2013.01); *H04L 67/02* (2013.01)

(58) Field of Classification Search
None
See application file for complete search history.

(56) References Cited

U.S. PATENT DOCUMENTS 8,151,341 B1 * 4/2012 Gudov ................ H04L 63/0263 726/13
10,652,254 B2 * 5/2020 Kuperman .......... H04L 63/1416
11,153,280 B1 * 10/2021 Walwadkar ........... H04L 63/166
11,991,149 B2 * 5/2024 Shomer ............... H04L 63/0236
12,438,847 B2 * 10/2025 Al Ghamdi ......... H04L 63/0263
2004/0030776 A1 * 2/2004 Cantrell ................ H04L 69/161 709/225
2008/0005293 A1 * 1/2008 Bhargava ............ H04L 67/1008 709/226
2008/0028456 A1 * 1/2008 O'Rourke ........... H04L 63/1458 726/11
2012/0304275 A1 * 11/2012 Ji ........................ H04L 63/0263 726/11
2016/0164837 A1 * 6/2016 Wu ......................... H04L 67/02 726/11
2016/0191644 A1 * 6/2016 Cohen ..................... H04L 47/80 709/219

(Continued)

*Primary Examiner* — Lashonda Jacobs-Burton
(74) *Attorney, Agent, or Firm* — Kilpatrick Townsend & Stockton LLP

(57) ABSTRACT

A web application firewall may be configured to receiving incoming traffic from client devices with requests for an application hosted on a server. The incoming traffic may be processed using a first filter that is configured to apply rules that identify suspicious traffic in the incoming traffic. The suspicious traffic from the first filter may be passed to second filter(s), and at least a portion of the incoming traffic that is not identified as suspicious traffic may be passed to the application. The suspicious traffic may then be processed using the second filter(s), which may be configured to perform a full filtering process on the suspicious traffic to identify traffic that may be allowed to reach the application, and traffic that should be prevented from reaching the application.

22 Claims, 4 Drawing Sheets

(56) References Cited

U.S. PATENT DOCUMENTS

| | | | | |
|---|---|---|---|---|
| 2016/0248801 | A1* | 8/2016 | Simon | H04L 63/1441 |
| 2017/0366505 | A1* | 12/2017 | Wright | H04L 47/20 |
| 2018/0020002 | A1* | 1/2018 | Duca | H04L 63/0236 |
| 2021/0036991 | A1* | 2/2021 | Owens | H04L 63/126 |
| 2021/0152525 | A1* | 5/2021 | Chaubey | H04L 63/0281 |
| 2021/0194852 | A1* | 6/2021 | Shomer | H04L 67/02 |
| 2022/0368672 | A1* | 11/2022 | Velugu | H04L 63/0236 |
| 2023/0073891 | A1* | 3/2023 | Wang | H04L 63/0209 |
| 2024/0146692 | A1* | 5/2024 | Isola | H04L 63/20 |
| 2025/0150436 | A1* | 5/2025 | Philip | H04L 63/1433 |

* cited by examiner

MULTI-LAYER CHAINING OF WEB APPLICATION FIREWALLS

TECHNICAL FIELD

This disclosure generally describes an architecture for a web application firewall for dynamic applications. More specifically, this disclosure describes an architecture that chains together multiple firewalls to reduce the complexity and enhance the performance of processing traffic for dynamic applications.

BACKGROUND

A web application firewall (WAF) is a security solution designed to protect web applications from a wide range of attacks and vulnerabilities. A WAF acts as a filter between a web application and the client, monitoring and analyzing incoming and outgoing HTTP/HTTPS traffic to identify and mitigate potential threats. For example, a WAF may analyze incoming traffic to identify and block malicious requests by inspecting the HTTP/HTTPS data packets, headers, payloads, and parameters, and comparing them against predefined security rules or patterns. This can identify common vulnerabilities like SQL injection, cross-site scripting (XSS), remote file inclusion, and so forth. By recognizing attack patterns or anomalies, it can take action to block or mitigate the impact of an attack. Generally, WAFs operate based on a set of predefined security rules. These rules define patterns or signatures associated with known attack vectors. By establishing a baseline of normal application behavior, the WAF can identify deviations that might indicate an attack. The WAF may then implement a positive security model, where the WAF allows only explicitly permitted requests based on allow-listing, rather than trying to identify and block malicious requests. This approach can enhance security by ensuring that only known valid requests are allowed.

SUMMARY

In some embodiments, a method of filtering traffic for web applications may include receiving incoming traffic from one or more client devices. The incoming traffic may include a plurality of requests for an application hosted on a server. The incoming traffic may be received by a web application firewall between the one or more client devices and the application. The method may also include processing the incoming traffic using a first filter in the web application firewall. The first filter may be configured to apply rules that identify suspicious traffic in the incoming traffic. The method may additionally include passing the suspicious traffic from the first filter to one or more second filters in the web application firewall, and passing at least a portion of the incoming traffic that is not identified as suspicious traffic to the application. The method may further include processing the suspicious traffic using the one or more second filters. The one or more second filters may be configured to perform an OWASP compliant ruleset based WAF on the suspicious traffic to identify traffic that may be allowed to reach the application. The method may also include rejecting, at the one or more second filters, the traffic that should be prevented from reaching the application and passing at least a portion of the traffic that is not rejected to the application.

In some embodiments, one or more non-transitory computer-readable media may store instructions that, when executed by one or more processors, cause the one or more processors to perform operations including receiving incoming traffic from one or more client devices. The incoming traffic may include a plurality of requests for an application hosted on a server. The incoming traffic may be received by a web application firewall between the one or more client devices and the application. The operations may also include processing the incoming traffic using a first filter in the web application firewall. The first filter may be configured to apply rules that identify suspicious traffic in the incoming traffic. The operations may additionally include passing the suspicious traffic from the first filter to one or more second filters in the web application firewall, and passing at least a portion of the incoming traffic that is not identified as suspicious traffic to the application. The operations may further include processing the suspicious traffic using the one or more second filters. The one or more second filters may be configured to perform an OWASP compliant ruleset based WAF on the suspicious traffic to identify traffic that may be allowed to reach the application. The operations may also include rejecting, at the one or more second filters, the traffic that should be prevented from reaching the application and passing at least a portion of the traffic that is not rejected to the application.

In some embodiments, a load balancer and firewall may include one or more processors and one or more memory devices storing instructions that, when executed by the one or more processors, cause the one or more processors to perform operations including receiving incoming traffic from one or more client devices. The incoming traffic may include a plurality of requests for an application hosted on a server. The incoming traffic may be received by a web application firewall between the one or more client devices and the application. The operations may also include processing the incoming traffic using a first filter in the web application firewall. The first filter may be configured to apply rules that identify suspicious traffic in the incoming traffic. The operations may additionally include passing the suspicious traffic from the first filter to one or more second filters in the web application firewall, and passing at least a portion of the incoming traffic that is not identified as suspicious traffic to the application. The operations may further include processing the suspicious traffic using the one or more second filters. The one or more second filters may be configured to perform an OWASP compliant ruleset based WAF on the suspicious traffic to identify traffic that may be allowed to reach the application. The operations may also include rejecting, at the one or more second filters, the traffic that should be prevented from reaching the application and passing at least a portion of the traffic that is not rejected to the application.

In any embodiments, any and/or all of the following features may be implemented in any combination and without limitation. The first filter and the second filter may be integrated with a load balancer, and the first filter and the second filter may be configured by the load balancer. The load balancer may configure a number of the second filters in the one or more second filters. The first filter, the second filter, and the load balancer may be integrated into a single software process, and the first filter may provide the second filter with the suspicious traffic within the software process. The first filter may be configured to allow false positives in the suspicious traffic. The first filter may be configured to apply the rules to identify suspicious traffic in dynamic content and static content. Processing the incoming traffic using the first filter may include identifying large requests in the incoming traffic comprising payloads that are above a predetermined size threshold and rejecting the large requests as rejected traffic without sending the requests to the second filter. The predetermined size threshold may be dynamically adjusted based on a workload of the second filter at runtime. The first filter may be configured to pass a predetermined percentage of the incoming traffic as suspicious traffic to the second filter. The predetermined percentage of suspicious traffic may be less than or about 10% of the incoming traffic. The predetermined percentage may be dynamically adjusted based on a workload of the second filter at runtime. The rules applied by the first filter may include regular expressions that are used to search the incoming traffic for SQL injections and cross-site scripting attacks. The rules applied by the first filter may include a pattern, a text description, a matching zone that identifies a portion of an incoming request to which the pattern is applied, and a score. Each of the rules applied by the first filter may include a score, and scores for each rule violation of a request may be aggregated and compared to one or more thresholds to determine whether the request is identified as suspicious traffic, allowed traffic, or rejected traffic. The rules applied by the first filter may include a plurality of patterns and combined scores to indicate suspicious traffic. The one or more second filters may include a single filter. The one or more second filters may include a plurality of additional filters. The first filter may be configured to pass allowed traffic to the application, to pass suspicious traffic to the one or more second filters, and/or to reject traffic that is not received by the one or more second filters or the application.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
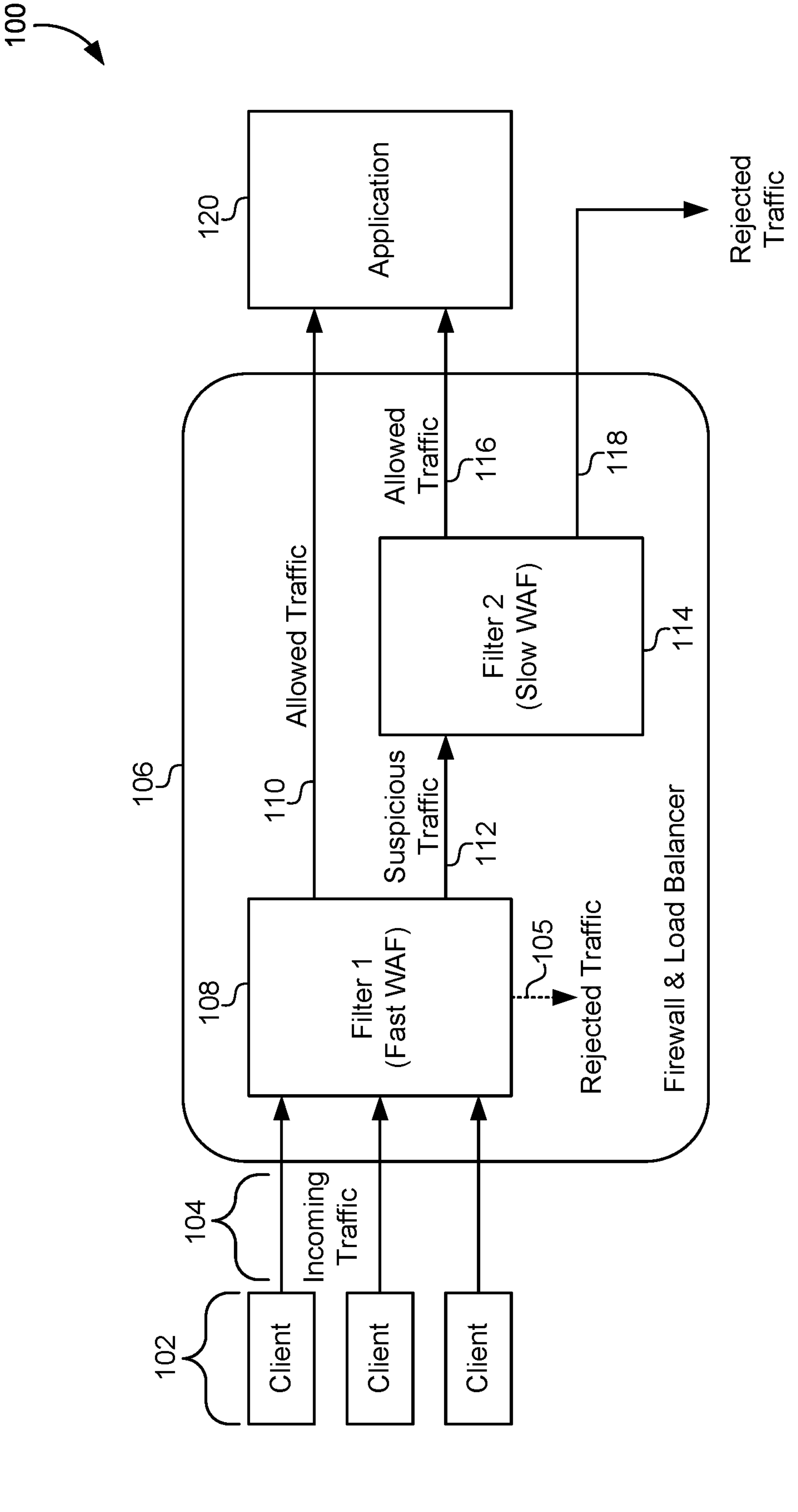
FIG. 1 illustrates a block diagram 100 of a multi-stage web application firewall, according to some embodiments.

In today's interconnected world, web applications are a crucial part of businesses, enabling them to provide services, engage with customers, and conduct online transactions. However, the increasing reliance on web applications also exposes organizations to a wide range of security threats. To mitigate these risks, web application firewalls (WAFs) have emerged as essential tools in the cybersecurity landscape.

There are a variety of open-source WAFs that provide advanced security features for protecting web applications against various types of attacks. There is also a large community of users based around WAF rulesets, typically called Core Rule Set (CRS), which is a set of rules that follow the best practices and security standards established by the Open Web Application Security Project (OWASP). A CRS is a set of predefined security rules that target common web application vulnerabilities and attacks, such as SQL injection (SQLI), cross-site scripting (XSS), remote file inclusion (RFI), among others. A CRS that is OWASP compliant and industry-recognized provides comprehensive protection, and its customizability makes it a popular choice as the rule set for open-source web application firewalls. There are multiple open-source OWASP compliant web application firewalls that utilize rule-based protection such as CRS.

ModSecurity (MODSEC) is an example of a popular open-source OWASP compliant web application firewall that acts as an intermediary between a web application and a client. It is designed to detect and prevent attacks, ensuring the security and integrity of web applications. MODSEC may be deployed as a standalone solution or integrated with existing an infrastructure, such as reverse proxies or load balancers. MODSEC is an example of an OWASP-compliant, ruleset-based WAF that operates on a set of predefined security rules, potentially using CRS, that detects and blocks malicious activities. Additionally, MODSEC allows the creation of custom rules to address specific application requirements. MODSEC primarily uses regular expression (REGEX) based rules, which impacts the performance and requires solutions for corner cases to cover all possible attacks. For example, MODSEC analyzes HTTP traffic and applies signature-based pattern matching, anomaly detection, and behavior analysis to identify suspicious activities. Upon detection, MODSEC may take actions such as blocking, redirecting, or logging the requests, effectively identifying and/or preventing attacks. MODSEC may also integrate with security information and event management (SIEM) systems, enabling the centralized collection, correlation, and analysis of security events from multiple sources. This integration may provide incident response capabilities and may simplify the monitoring of web application security across an organization's infrastructure.

MODSEC provides a number of advantages, including robust protection against common web application vulnerabilities, safeguarding critical assets and sensitive data. By actively monitoring and blocking malicious activities, it reduces the risk of successful attacks, minimizing the potential impact on the application and its users. MODSEC also provides a flexible framework that allows organizations to tailor the security rules and configuration to their specific needs. The ability to create custom rules and fine-tune the WAF's behavior allows organizations to adapt MODSEC to their unique application requirements. With the flexibility and cost-effectiveness, it offers, MODSEC remains a popular choice for organizations safeguarding their web applications and maintain the trust of their users in an increasingly connected digital landscape.

However, despite the many advantages provided by MODESC, it's use also includes a number of potential disadvantages. First MODSEC's rule-based security approach may sometimes generate false positives, flagging legitimate requests or activities as malicious. False positives can disrupt the normal functioning of web applications, leading to user frustration and potentially impacting the user experience. Fine-tuning the rules and configuring MODSEC appropriately can help minimize false positives, but it requires careful monitoring and maintenance. On the other hand, MODSEC may also encounter false negatives, where it fails to detect certain types of attacks or vulnerabilities. This can occur if the security rules are not adequately updated or if the attackers employ sophisticated evasion techniques that bypass the rule set. Organizations need to constantly ensure that they keep MODSEC up to date with the latest security rules and regularly monitor its effectiveness.

In addition to false positives/negatives, implementing MODSEC as a web application firewall introduces additional processing overhead. The inspection and analysis of incoming requests can consume system resources, potentially leading to increased latency, decreased overall performance, and higher infrastructure costs. MODSEC's configuration and management can be very complex, especially for organizations with limited cybersecurity expertise. Effective utilization of MODSEC requires knowledge of web application security, attack patterns, and the ability to fine-tune rules and policies to match the specific requirements of the application. Organizations may need to allocate time and resources to management of MODSEC. Introducing MODSEC into an existing web application infrastructure may also raise compatibility challenges. Certain web applications or frameworks may have specific requirements or configurations that conflict with MODSEC's default rules. Organizations need to carefully test and validate the compatibility of MODSEC with their specific application stack to ensure proper functionality.

The embodiments described herein solve many of the problems associated with MODESC security applications, while simultaneously maintaining nearly all of the benefits they provide. More specifically, these embodiments use a two-staged filtering solution for incoming traffic. The first filter essentially separates the traffic into groups of suspicious and non-suspicious requests. The non-suspicious requests may be passed directly to the application without further processing. However, the suspicious requests may be funneled into the second filter. The first filter may be characterized by operating very fast in comparison to the second filter. The first filter may be a more performant WAF, primarily because it need not use any regular expression rules. The first filter may also be optimized to minimize false negatives, such that it may separate the suspicious and non-suspicious requests very quickly, sometimes referred to as a "coarse" filter. Then, since the number of suspicious requests will be relatively small compared to the total number of incoming requests, the suspicious requests may be processed by the second filter. The second filter may then spend more time in processing power in filtering the suspicious requests since the number has been greatly reduced by the first filter.

FIG. 1 illustrates a block diagram 100 of a multi-stage web application firewall, according to some embodiments. A firewall 106 may be installed on a server that receives incoming traffic 104 from one or more client devices 102. The incoming traffic 104 may include web requests (e.g., Web Service requests, REST requests, database queries, form submissions, and/or any other type of Internet traffic) sent from the client devices 102 to an application 120. The application 120 may include any type of application available over a network, such as a web application, a dynamic application, and so forth. Although the incoming traffic 104 is illustrated in FIG. 1 as being unidirectional, it should be understood that the application 120 may also send responses or data back to the client devices 102 and/or to other systems not explicitly shown in FIG. 1.

As the incoming traffic 104 is received at the server, the incoming traffic 104 may first pass through the firewall 106 before being allowed access to the application 120. In some embodiments, the firewall 106 may include a firewall coupled with a load balancer to distribute the incoming traffic 104 to different server locations or different instances of the application 120. For the sake of clarity, the load balancer operations are not explicitly shown in FIG. 1. However, any type of allowed traffic that passes through the firewall 106 may be load balanced and sent to different instances of the application 120. For example, the firewall 106 may be integrated with a load balancer such as the TCP/HTTP load balancer provided by HAProxy®. The firewall capabilities of the firewall 106 may also be integrated with any other commercially available or custom load balancer utility.

As illustrated in FIG. 1, the firewall 106 may include a first filter 108, or a first web application firewall that is chained together with a second filter 114, or a second web application firewall (WAF). As described above, using a MODSEC WAF to filter all of the incoming traffic 104 imposes a large overhead burden and processing power requirement on the firewall 106. The embodiments described herein take advantage of the benefits of a MODSEC WAF by first funneling the incoming traffic 104 through a "fast" WAF that is configured to minimize false negatives when identifying suspicious traffic 112. For example, the first filter 108 may identify a subset of the incoming traffic 104 as not being suspicious and may pass this traffic through as allowed traffic 110 to the application 120. The first filter 108 may be configured to only pass traffic that is not suspicious with a very high confidence threshold. Thus, the allowed traffic 110 may be sent to the application 120 without further processing.

The first filter 108 may identify the suspicious traffic 112 present in the incoming traffic 104. However, the first filter 108 may also allow for a number of false positives that may erroneously identify non-suspicious traffic as being a part of the suspicious traffic 112. Instead of fully processing the incoming traffic 104 using full MODSEC operations, the first filter 108 may instead be configured to quickly identify traffic that may be suspicious while passing the allowed traffic 110 that is safe for the application 120.

Normally, the false positives that may be present in the first filter 108 would be problematic for the application 120. For example, many requests in the incoming traffic 104 would be erroneously identified as suspicious traffic 112 and filtered from the system before reaching the application 120. However, the suspicious traffic 112 is passed from the first filter 108 to a second filter 114 for further filtering. The second filter 114 may be configured to fully process the suspicious traffic 112 using, in some cases, full MODSEC operations. The second filter 114 may then pass a second subset of the incoming traffic 104 as allowed traffic 116 to the application 120. The traffic that has been identified as suspicious by both the first filter 108 and the second filter 114 may then be prevented from reaching the application 120 as rejected traffic 118.

The second filter 114 may perform the full MODSEC operations on the suspicious traffic 112 while still maintaining a high throughput for the firewall 106 as a whole. For example, since only a small amount of the incoming traffic 104 will typically be identified as suspicious traffic 112 by the first filter 108, the second filter 114 will generally operate on only a small fraction of the incoming traffic 104. This allows the second filter 114 to use more time and/or processing power to filter the suspicious traffic 112 thoroughly. Since the first filter 108 operates relatively quickly and uses much less processing power in comparison to the second filter 114, the large majority of the incoming traffic 104 can be processed very quickly and passed to the application 120 or set aside as suspicious traffic 112 for further processing.

The first filter 108 may be characterized as a WAF that is configured to operate on a much broader spectrum of potentially anomalous requests, however its primary goal is to identify all suspicious traffic (i.e., to minimize false negatives). For example, the first filter 108 may be configured to be very sensitive to any sort of anomalous input received in the incoming traffic 104, which may result in the false positives described above. Thus, the first filter 108 may identify the allowed traffic 110 with a high level of certainty, while also identifying suspicious traffic 112 with a lower level of certainty that allows for false positives. Since a more robust filtering operation is performed by the second filter 114, the suspicious traffic 112 may be more thoroughly examined, processed, and filtered since the volume of the suspicious traffic 112 was greatly reduced by the first filter 108. For example, the second filter 114 may be implemented using a standard MODSEC module that performs full MODSEC operations on the suspicious traffic 112.

In contrast to the allow-list operations performed by the second filter 114, the first filter 108 may operate using a deny-list on the incoming traffic 104. For example, the first filter 108 may be configured to identify known keywords or sequences that identified with anomalies or suspicious traffic in the incoming traffic 104. The first filter 108 may examine strings in the requests of the incoming traffic 104 to identify nonalphanumeric characters or other suspicious characters. The first filter 108 may also identify strings that are not commonly found in requests associated with web applications. More generally, the first filter 108 may identify strings that are known to be associated with suspicious traffic and/or strings that are not associated with legitimate traffic. The first filter 108 may identify the suspicious strings or other components of the incoming requests by performing a string comparison or regex operation on data in the incoming traffic 104. For example, the first filter 108 may examine specific portions of the incoming traffic, 104, such as the URL, the path, any associated cookies, and so forth to identify suspicious data strings by comparison to a list of known suspicious substrings.

This type of processing is effective at identifying a malicious "injection" in an otherwise legitimate request. An injection may refer to malicious code that is hidden within a request. For example, an otherwise legitimate request may inject malicious SQL code into a portion of the request as part of an attack. By identifying substrings that are known to be part of known injections, the first filter 108 may prevent these injections from being passed to the application 120. Optionally, some embodiments of the first filter 108 may also identify rejected traffic 105 that may be immediately rejected rather than being passed as suspicious traffic 112 to the second filter 114. For example, if a malicious injection is identified in the incoming traffic 104, the first filter 108 may reject the requests with the malicious injection as rejected traffic 105 rather than passing these requests on to the second filter 114 as suspicious traffic 112. Since one of the primary functions of the first filter 108 is to minimize the amount of suspicious traffic 112 that requires full processing by the second filter 114, immediately rejecting the rejected traffic 105 may further reduce the time and processing power required by the second filter 114 to identify the allowed traffic 116 passed to the application 120. The high-cost operations can thus be minimized to only the suspicious traffic 112 that is not affirmatively identified as allowed traffic 110 or rejected traffic 105 by the first filter 108.

In some embodiments, the first filter 108 and the second filter 114 may operate within the same software process. This may be distinguished with implementations that operate the first filter 108 and the second filter 114 as separate software processes. The first filter 108 and the second filter 114 may be configured by the load balancer. For example, the load balancer functionality of the firewall 106 may configure the filters and chain the filters together as illustrated in FIG. 1. For example, the load balancer function may configure the number of filtering stages and how these filtering stages are chained together. Instead of the first filter 108 executing single processes and exiting, then synchronously or asynchronously passing the results to a separate process that operates a second filter 114, the firewall 106 may operate both filters as a single process that does not exit during execution and that passes data between the two filters within the single process. For example, the first filter 108 may pass the suspicious traffic 112 to the second filter 114 within the single software process.

The firewall 106 may also be configured to handle dynamic content in the incoming traffic 104. For example, instead of simply filtering out traffic with static content at the first filter 108, the first filter 108 may use the rule-based approach to also filter dynamic content at this stage. Therefore, the first filter 108 may treat static and dynamic content similarly to focus on identifying malicious requests rather than simply filtering by a designation as static or dynamic.

In some embodiments, the first filter 108 may be configured to block requests with a larger payload. For example, MODSEC may require minutes or even tens of minutes to fully process requests with a large payload. Therefore, some embodiments may set a threshold size limit and compare the payload of the request to the size limit at the first filter 108. For requests that exceed this predetermined size threshold, the first filter 108 may reject these requests as rejected traffic 105. Alternatively, if the workload of the second filter 114 is relatively low (i.e., below a predetermined threshold level of activity), the first filter 108 may pass the requests that exceed the size threshold as suspicious traffic 112 to the second filter 114. This feature may be fully configurable by an administrator such that the size threshold for the requests and the activity threshold of the second filter may be dynamically adjusted during runtime by an administrator or automatically adjusted by the firewall 106. For example, large request may be processed by the second filter 114 until the activity level of the second filter 114 exceeds the threshold, then large request may be rejected as rejected traffic 105 so as not to adversely affect the performance of the overall system.

Some embodiments may target a specific workload or percentage of the incoming traffic 104 that are passed as suspicious traffic 112 on to the second filter 114. For example, some embodiments may target passing approximately 90% of the incoming traffic 104 through as allowed traffic 110 at the first filter 108 while only passing approximately 10% of the incoming traffic 104 as suspicious traffic 112 to the second filter 114. This percentage may be adjusted based on the particular application 120. For example, some applications may typically receive small and/or simple requests. For these types of requests, a higher percentage (e.g., 50% or greater) may be passed to the second filter 114, which may be able to process small, simple requests very quickly. However other applications that receive larger or more complex requests may allow a much smaller percentage (e.g., less than or about 10%) to be passed to the second filter 114, since these requests may take longer to process. The percentage may be dynamically adjusted at runtime based on a workload of the second filter, or statically adjusted based on a target percentage for the application 120. The first filter 108 may be configured such that the predetermined percentage is about 1% or less, about 2% or less, about 3% or less, about 4% or less, about 5% or less, about 10% or less, about 15% or less, about 20% or less, about 25% or less, about 30% or less, about 35% or less, about 40% or less, about 45% or less, about 50% or less, about 55% or less, about 60% or less, about 65% or less, about 70% or less, about 75% or less, about 85% or less, and so forth, depending on the type of requests received by the application 120 and/or the resources available to the firewall 106.

Adjusting the percentage of requests that are passed as suspicious traffic 112 to the second filter 114 may be accomplished by adding simple rules to the first filter 108. Typically, the first filter 108 may use a baseline set of simple rules that identify the suspicious traffic 112. This has been found to be acceptable for the majority of applications. However, if the percentage of suspicious traffic 112 should be increased/decreased based on the particular needs of the application 120, additional rules may be added to the baseline rule set of the first filter 108 that either allow or restrict more of the incoming traffic 104.

The rules for the first filter 108 may be defined using a number of different methods. For example, the rules may include a match condition that defines a pattern that, if found in the incoming traffic 104 or a response, may trigger a rule violation. These match conditions may include a literal string match, a regular expression match, a test for SQL injection artifacts, a test for cross-site scripting attacks, and so forth. The rule may also include a message comprising text to include in the log that describes the rule. Next, the rule may include a match zone that limits the parts of the request to which the match condition or pattern will be applied. For example, a condition may apply only to a URL or arguments of an HTTP request but may exclude the request body. Alternatively, the rule may apply to a cookie HTTP header specifically. A rule may be applied to several different matching zones within the incoming traffic, and rules may be combined or "piped" together using Boolean operators. For example, some embodiments may allow matching zones to be defined for an HTTP GET argument, an HTTP header, a body of a POST request, a requested URL, a GET argument with a specified name, various arguments in the request, and/or any other part of the request.

In some embodiments, a score may be associated with each rule that will be applied for a violation. For example, when rules are violated at the first filter 108, a number of points corresponding to this score may be added to an overall score for the request. For each rule violation detected for a request, the individual rule scores may be aggregated to generate an overall score for the request. The first filter 108 may then test the overall score against a threshold to determine whether the traffic should be flagged as suspicious traffic 112. Some embodiments may also use a second, higher threshold to determine whether the incoming traffic 104 may be labeled as rejected traffic 105 at the first filter 108. More serious rule violations may be assigned a higher score, such that they contribute more to the overall score and the rejection of the request.

By way of example, a rule that tests for SQL injections may be defined as follows.

MainRule "rx:select|union|update|delete|insert|table|from|ascii-|hex|unhex|drop|load_file|substr|group_concat|dump-file" "msg:sql keywords" "mz:BODY|URL|ARGS-|$HEADERS_VAR:Cookie" "s:$SQL:4" id:1000;

As another example, rules that test for cross-site scripting may be defined as follows.

MainRule "str:<" "msg:html open tag" "mz:ARGS|UR-L|BODY|$HEADERS_VAR:Cookie" "s:$XSS:8" id:1302;

MainRule "str:>" "msg:html close tag" "mz:ARGS|UR-L|BODY|$HEADERS_VAR:Cookie" "s:$XSS:8" id:1303;

As another example, rules that test for remote file inclusion (RFI) may be defined as follows.

MainRule "str:http://" "msg:http://scheme" "mz:ARGS-|BODY|$HEADERS_VAR:Cookie" "s:$RFI:8" id:1100;

MainRule "str:https://" "msg:https://scheme" "mz:ARGS|BODY|$HEADERS_VAR:Cookie" "s:$RFI:8" id:1101;

MainRule "str:ftp://" "msg:ftp://scheme" "mz:ARGS-|BODY|$HEADERS_VAR:Cookie" "s:$RFI:8" id:1102;

The implementation of the first filter may operate as a layer 7 (application layer) filtering module, allowing it to inspect and analyze the content of HTTP requests and responses. The first filter 108 may utilize a rule-based approach to identify and block potentially malicious requests that exhibit patterns associated with XSS and SQL injection attacks. As described above, these rules define patterns and signatures associated with known attack vectors and malicious payloads.

For example, an open-source WAF (e.g., Nginx Anti XSS & SQL Injection, or "NAXSI") may be customized to operate as the first filter 108 in conjunction with the load balancer as illustrated in FIG. 1. The NAXSI framework compares the content of HTTP requests against these rules and takes action based on the configured filtering policies. However, NAXSI alone cannot be used to implement the first filter 108 without significant customizations. Therefore, the first filter 108 may be distinguished from NAXSI in a number of different ways by virtue of the customizations or additional features that may be added to be compatible with the architecture described above. These differences are described in general terms as follows.

Cookies may be uniquely examined by the first filter 108. As described above, a matching zone in the incoming traffic may allow rules to specifically target cookies with additional body-specific actions with conditional rules in the first filter 108. For example, each cookie name/value pair may be evaluated instead of the whole header value of the cookie. Additional body actions in request cookies may be introduced that may be used depending on the particular processing phase (e.g., when the body is being processed by the first filter 108).

The first filter 108 may be configured to have a processing timeout and body limit per filter instance. Some embodiments may also limit the number of JSON levels available to limit recursion depth. These features may limit cases where rule evaluation takes too long at the first filter 108. Similarly, limiting the number of JSON levels may exit processing on requests with a JSON body that is too complex and requiring too much time to process.

Some embodiments may customize the "libinjection" library used by an SQLi/XXS analyzer with a Least-Recently Used ("LRU") cache. For example, the LRU cache may be enabled with a configurable size, and the libinjection direct look at may be skipped if an object is found in the LRU cache. In some cases, using libinjection may cause false positives. However, the ability to customize rules and patterns can deal with any potential false positives generated by libinjection. Some embodiments may add different flag combinations for libinjection to make the libinjection detection more adjustable.

Some embodiments may also add logging configurations to the first filter 108. These configurations may include a log level, a match ID, a rule message, allow-list rules, deny-list rules, and/or any other features described above. The log level configuration may be used to split the logs from the first filter 108 from other logs generated by the firewall 106 (such as the load balancer). Each line in the log may include a match ID of the current match that triggered a specific rule.

Some embodiments may further configure the second filter 114 to store results in variables that may be accessible and usable by the firewall 106. This may allow for advanced features to be enabled in the firewall 106 and may share information effectively between these modules within the same software process described above. A unique ID format may be used to mark each transaction to be compatible with any specific formats used by the firewall 106 or load balancer.

Figure 2:
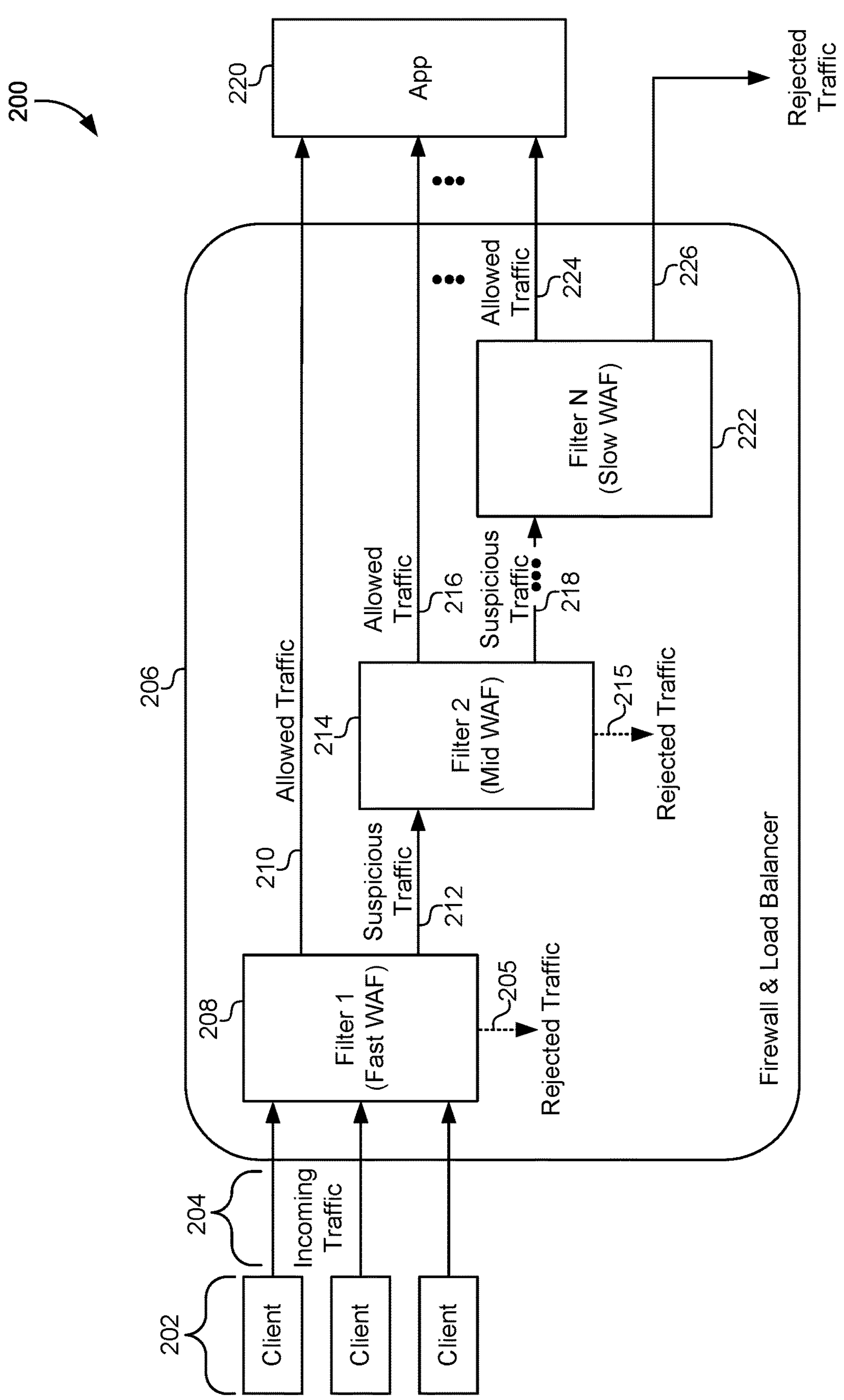
FIG. 2 illustrates a block diagram 200 of a multi-stage web application firewall, according to some embodiments.

FIG. 2 illustrates a block diagram 200 of a multi-stage web application firewall, according to some embodiments. This block diagram 200 is similar to the block diagram 100 in FIG. 1 but allows for additional filter stages between the first filter and the final filter. As described above, incoming traffic 204 may be received from one or more client devices 202 at a combined web application firewall and load balancer (referred to simply as the firewall 206). A first filter 208 may be configured to operate very quickly and pass a large amount of the traffic as allowed traffic 210. The first filter 208 may function similarly to the first filter 108 described above in FIG. 1. For example, the first filter 208 may reject traffic with a high enough violation score as rejected traffic 205 and pass suspicious traffic 212 to subsequent filter stages.

Instead of using only a single second filter as in FIG. 1, this architecture may include a plurality of additional filter stages after the first filter 208. For example, a second filter 214 may be configured to receive the suspicious traffic 212 from the first filter 208 for processing. The second filter 214 may operate similar to the first filter 208, but the second filter 214 may use a more restrictive set of rules that are configured to reject a higher percentage of the incoming traffic 204. However, since most of the incoming traffic 204 has already been passed as allowed traffic 210 by the first filter 208, the second filter 214 serves to further limit the amount of suspicious traffic 218 that will eventually be passed on to the MODSEC filter. The second filter 214 may further pass additional allowed traffic 216 to the application 220 and/or may optionally reject additional traffic as rejected traffic 215.

Although not shown explicitly in FIG. 2, additional filter stages may be included between the second filter 214 and the final filter 222. The final filter 222 may operate similarly to the second filter 114 described above in FIG. 1. For example, the final filter 222 may be implemented using a full MODSEC module, which may be optionally modified as described above. The final filter 222 may pass the allowed traffic 224 to the application 220 and finally reject any remaining messages as rejected traffic 226.

In FIG. 2, each of the intermediate filter stages may be configured to become more restrictive, thereby filtering more of the requests from the incoming traffic 204. For example, each filter stage may be configured to filter a particular type of attack (e.g., an SQL injection attack, a file upload attack, and so forth). This allows each filter stage to be fine-tuned to a particular type of attack or rule set.

In some embodiments, additional filter stagers may be dynamically enabled/disabled as needed. For example, if the workload of the final filter 222 becomes too high (e.g., the final filter 222 is taking too long to process requests, or if the request sizes are very large) additional filter stages may be enabled to further restrict the number and/or type of requests that are passed as suspicious traffic 218 to the final filter 222. Some embodiments may set up an alternative to combat high workloads. For example, thresholds for resource utilization may be established, and a circuit breaker pattern may be implemented to ensure that no filter can fully exhaust the allocated resources. This may be configured by the load balancer configuration as described above.

Figure 3:
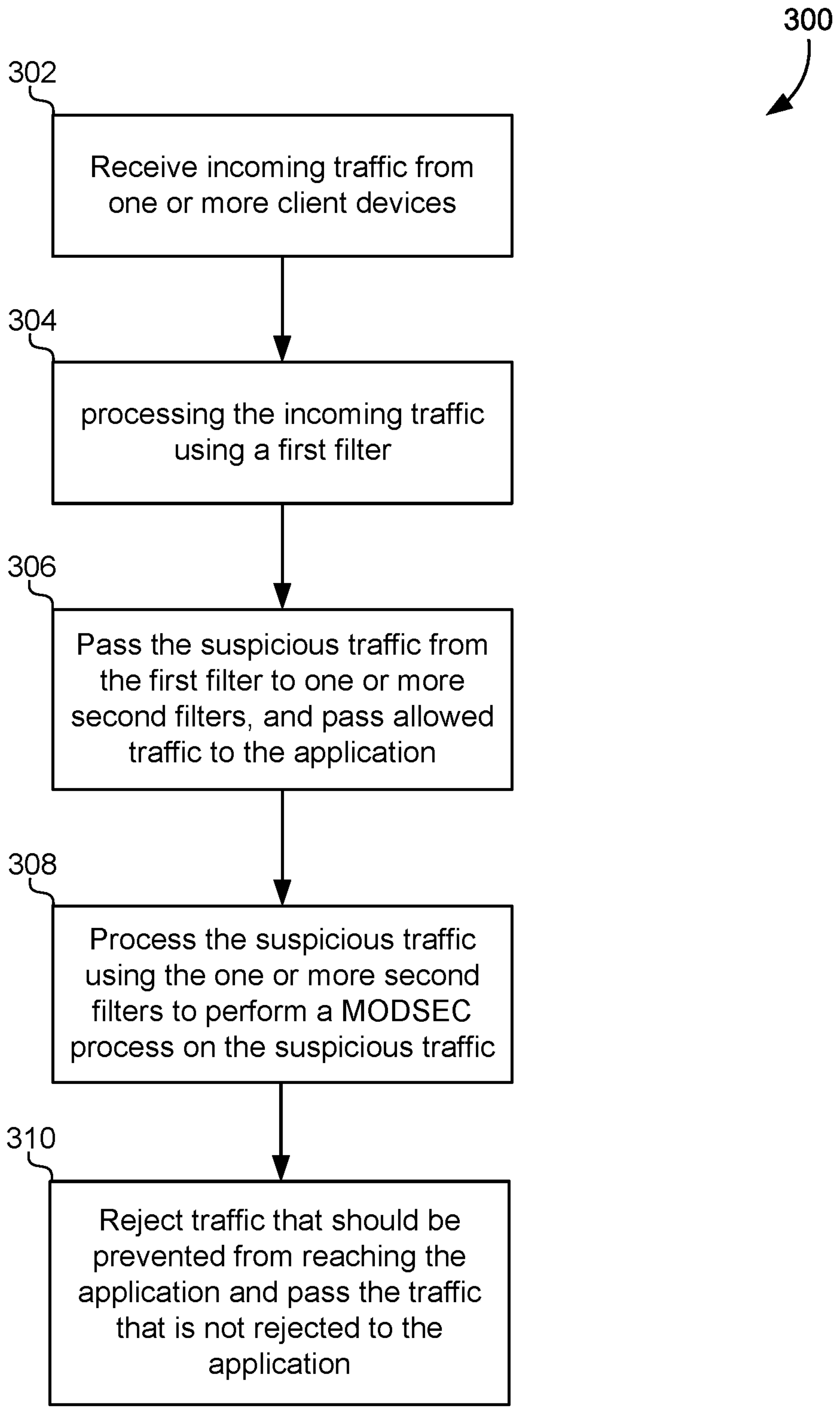
FIG. 3 illustrates a flowchart of a method for filtering traffic for web applications, according to some embodiments.

FIG. 3 illustrates a flowchart 300 of a method for filtering traffic for web applications, according to some embodiments. The method may include receiving incoming traffic from one or more client devices (302). The incoming traffic may include a plurality of requests for an application hosted on a server. The incoming traffic may be received by a web application firewall between the one or more client devices and the application. For example, the web application firewall may include the combined firewall and load balancer described above in FIG. 1 and in FIG. 2. The firewall may intercept requests that are sent to the application to process requests before they are forwarded to the application or rejected by the firewall.

The method may also include processing the incoming traffic using a first filter in the web application firewall (304). The first filter may be configured to apply rules that identify suspicious traffic in the incoming traffic. For example, the first filter may be implemented as described above by the first filter 108 in FIG. 1 and/or the first filter 208 in FIG. 2. The first filter may be characterized by identifying suspicious traffic using the rules and passing the remaining traffic as allowed traffic to the application. The first filter may be configured to pass a percentage of the traffic to the application while diverting the remaining portion of the traffic, labeled as suspicious traffic, to the subsequent filter stages as described above.

The method may additionally include passing the suspicious traffic from the first filter to one or more second filters in the web application firewall (306). The one or more second filters may also pass at least a portion of the incoming traffic that is not identified as suspicious traffic to the application. The one or more second filters may include a single second filter as depicted in FIG. 1. Alternatively, the one or more second filters may include a plurality of additional filters after the first filter as depicted in FIG. 2. In addition to passing the suspicious traffic to the one or more second filters, the first filter may be configured to pass at least a portion of the incoming traffic that is not identified as suspicious traffic to the application. For example, the first filter may pass allowed traffic to the application is depicted in FIG. 1 and FIG. 2. Additionally, the first filter may be configured to reject traffic such that the rejected traffic is not received by the one or more second filters or the application.

The method may further include processing the suspicious traffic using the one or more second filters (308). The one or more second filters may be configured to perform MODSEC WAF operations on the suspicious traffic to identify valid traffic that may be allowed to reach the application. In some embodiments, the MODSEC WAF may be modified to be compatible with the load balancer operation. For example, the MODSEC WAF may be modified to include logs or variables that are accessible by the load balancer and other portions of the firewall. One or more second filters may each be configured to further reduce the total amount of suspicious traffic that are analyzed by the MODSEC WAF. The MODSEC WAF may be implemented in a final filter of the one or more second filters, while each of the other one or more second filters may operate by applying deny-list rules as described above for the first filter.

The method may also include rejecting, at the one or more second filters, the traffic that should be prevented from reaching the application and passing at least a portion of the traffic that is not rejected to the application (310). Each of the one or more second filters may be configured to further identify allowed traffic that may immediately be passed to the application, while also identifying rejected traffic that should not be passed to the application. Suspicious traffic may continue to be refined and passed to each subsequent filtering stage as depicted in FIG. 2. The final filter may perform a final rejection of the traffic and pass any remaining traffic to the application.

It should be appreciated that the specific steps illustrated in FIG. 3 provide particular methods of filtering traffic for web applications according to various embodiments. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user or may be done automatically by a computer system without human intervention where any determinations are made by a processor.

Furthermore, each of the methods described herein may be implemented as a set of instructions stored on one or more tangible, non-transitory, computer-readable storage media to form a tangible software product. The one or more media may include any type of memory device, such as processor memories, cache memories, server memories, storage disks, and so forth. The one or more media may be located on a single computer system, or may otherwise be distributed to a number of different computer systems, such as different servers. For example, the instructions may be distributed to storage media on distributed processors, each of which performs a portion of the operations described herein at different locations.

Figure 4:
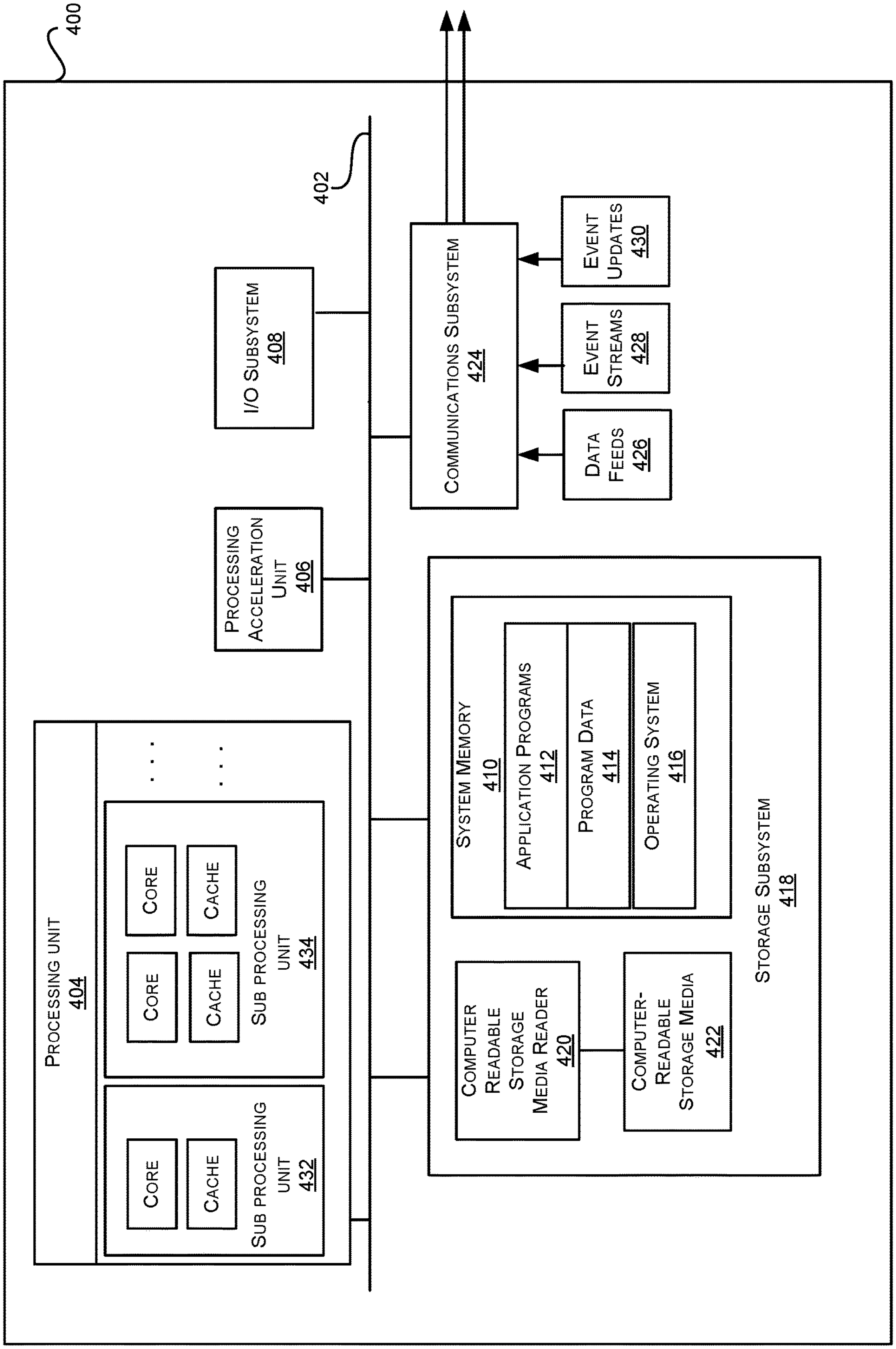
FIG. 4 illustrates an exemplary computer system, in which various embodiments may be implemented.

FIG. 4 illustrates an exemplary computer system 400, in which various embodiments may be implemented. The system 400 may be used to implement any of the computer systems described above. For example, the computer system 400 may be used to implement the firewall 106, the first filter 108 and/or the second filter 114 in FIG. 1. The computer system 400 may also be used implemented firewall 206 and/or any of the filtering stages depicted in FIG. 2. As shown in FIG. 4, computer system 400 includes a processing unit 404 that communicates with a number of peripheral subsystems via a bus subsystem 402. These peripheral subsystems may include a processing acceleration unit 406, an I/O subsystem 408, a storage subsystem 418 and a communications subsystem 424. Storage subsystem 418 includes tangible computer-readable storage media 422 and a system memory 410.

Bus subsystem 402 provides a mechanism for letting the various components and subsystems of computer system 400 communicate with each other as intended. Although bus subsystem 402 is shown schematically as a single bus, alternative embodiments of the bus subsystem may utilize multiple buses. Bus subsystem 402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which can be implemented as one or more integrated circuits (e.g., a conventional microprocessor or microcontroller), controls the operation of computer system 400. One or more processors may be included in processing unit 404. These processors may include single core or multicore processors. In certain embodiments, processing unit 404 may be implemented as one or more independent processing units 432 and/or 434 with single or multicore processors included in each processing unit. In other embodiments, processing unit 404 may also be implemented as a quad-core processing unit formed by integrating two dual-core processors into a single chip.

In various embodiments, processing unit 404 can execute a variety of programs in response to program code and can maintain multiple concurrently executing programs or processes. At any given time, some or all of the program code to be executed can be resident in processor(s) 404 and/or in storage subsystem 418. Through suitable programming, processor(s) 404 can provide various functionalities described above. Computer system 400 may additionally include a processing acceleration unit 406, which can include a digital signal processor (DSP), a special-purpose processor, and/or the like.

I/O subsystem 408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 400 may comprise a storage subsystem 418 that comprises software elements, shown as being currently located within a system memory 410. System memory 410 may store program instructions that are loadable and executable on processing unit 404, as well as data generated during the execution of these programs.

Depending on the configuration and type of computer system 400, system memory 410 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 404. In some implementations, system memory 410 may include multiple different types of memory, such as static random-access memory (SRAM) or dynamic random-access memory (DRAM). In some implementations, a basic input/output system (BIOS), containing the basic routines that help to transfer information between elements within computer system 400, such as during start-up, may typically be stored in the ROM. By way of example, and not limitation, system memory 410 also illustrates application programs 412, which may include client applications, Web browsers, mid-tier applications, relational database management systems (RDBMS), etc., program data 414, and an operating system 416. By way of example, operating system 416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 418 may also provide a tangible computer-readable storage medium for storing the basic programming and data constructs that provide the functionality of some embodiments. Software (programs, code modules, instructions) that when executed by a processor provide the functionality described above may be stored in storage subsystem 418. These software modules or instructions may be executed by processing unit 404. Storage subsystem 418 may also provide a repository for storing data used in accordance with some embodiments.

Storage subsystem 400 may also include a computer-readable storage media reader 420 that can further be connected to computer-readable storage media 422. Together and optionally, in combination with system memory 410, computer-readable storage media 422 may comprehensively represent remote, local, fixed, and/or removable storage devices plus storage media for temporarily and/or more permanently containing, storing, transmitting, and retrieving computer-readable information.

Computer-readable storage media 422 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 400.

By way of example, computer-readable storage media 422 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 422 may include, but is not limited to, Zip® drives, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 424 provides an interface to other computer systems and networks. Communications subsystem 424 serves as an interface for receiving data from and transmitting data to other systems from computer system 400. For example, communications subsystem 424 may enable computer system 400 to connect to one or more devices via the Internet. In some embodiments communications subsystem 424 can include radio frequency (RF) transceiver components for accessing wireless voice and/or data networks (e.g., using cellular telephone technology, advanced data network technology, such as 3G, 4G or EDGE (enhanced data rates for global evolution), WIFI (IEEE 802.11 family standards, or other mobile communication technologies, or any combination thereof), global positioning system (GPS) receiver components, and/or other components. In some embodiments communications subsystem 424 can provide wired network connectivity (e.g., Ethernet) in addition to or instead of a wireless interface.

In some embodiments, communications subsystem 424 may also receive input communication in the form of structured and/or unstructured data feeds 426, event streams 428, event updates 430, and the like on behalf of one or more users who may use computer system 400.

By way of example, communications subsystem 424 may be configured to receive data feeds 426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 424 may also be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 424 may also be configured to output the structured and/or unstructured data feeds 426, event streams 428, event updates 430, and the like to one or more databases that may be in communication with one or more streaming data source computers coupled to computer system 400.

Computer system 400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of filtering traffic for web applications, the method comprising:

receiving incoming traffic from one or more client devices at a reverse proxy, wherein the incoming traffic comprises a plurality of requests for an application hosted on a server, and the incoming traffic is received by a Web Application Firewall (WAF) between the one or more client devices and the application;

operating a first filter in the WAF as a layer 7 (application layer) filter to inspect and analyze content of the plurality of requests;

processing the content of the incoming traffic using the first filter in the WAF, wherein the first filter is configured to apply rules that identify suspicious traffic in the incoming traffic;

passing the suspicious traffic from the first filter to one or more second filters in the WAF, and passing at least a portion of the incoming traffic that is not identified as suspicious traffic to the application, wherein the first filter, the one or more second filters, and the reverse proxy are integrated into a single software process, and the first filter provides the one or more second filters with the suspicious traffic within the single software process;

processing the suspicious traffic using the one or more second filters, wherein the one or more second filters are configured to perform an Open Web Application Security Project (OWASP) compliant ruleset based WAF on the suspicious traffic to identify a first portion of the suspicious traffic that is allowed to reach the application; and rejecting, at the one or more second filters, a second portion of the suspicious traffic that is not allowed to reach the application and passing at least the first portion of the suspicious traffic to the application.

2. The method of claim 1, wherein the first filter and the second filter are integrated with a load balancer, and the first filter and the second filter are configured by the load balancer, wherein the load balancer configures a number of the second filters in the one or more second filters.

3. The method of claim 1, wherein the first filter is configured to allow false positives in the suspicious traffic.

4. The method of claim 1, wherein the first filter is configured to apply the rules to identify suspicious traffic in dynamic content and static content.

5. The method of claim 1, wherein processing the incoming traffic using the first filter comprises identifying requests in the incoming traffic comprising payloads that are above a predetermined size threshold and rejecting the identified requests as rejected traffic without sending the identified requests to the second filter.

6. The method of claim 5, wherein the predetermined size threshold is dynamically adjusted based on a workload of the second filter at runtime.

7. The method of claim 1, wherein inspecting the content comprises evaluating a JavaScript Object Notation (JSON) body, and wherein the first filter is configured to exit processing and pass the incoming traffic as the suspicious traffic to the second filter when a recursion depth of the JSON body exceeds a predetermined limit.

8. The method of claim 1, wherein the first filter is configured to evaluate an HTTP cookie within the content by uniquely examining each cookie name/value pair within a header value of the HTTP cookie.

9. The method of claim 1, further comprising terminating, by the reverse proxy, a Transport Layer Security (TLS) connection associated with the incoming traffic to extract the content as a plain-text application-layer payload within the single software process.

10. One or more non-transitory computer-readable media comprising instructions that, when executed by one or more processors, cause the one or more processors to perform operations comprising:

receiving incoming traffic from one or more client devices at a reverse proxy, wherein the incoming traffic comprises a plurality of requests for an application hosted on a server, and the incoming traffic is received by a Web Application Firewall (WAF) between the one or more client devices and the application;

operating a first filter in the WAF as a layer 7 (application layer) filter to inspect and analyze content of the plurality of requests;

processing the content of the incoming traffic using the first filter in the WAF, wherein the first filter is configured to apply rules that identify suspicious traffic in the incoming traffic;

passing the suspicious traffic from the first filter to one or more second filters in the WAF, and passing at least a portion of the incoming traffic that is not identified as suspicious traffic to the application, wherein the first filter, the one or more second filters, and the reverse proxy are integrated into a single software process, and the first filter provides the one or more second filters with the suspicious traffic within the single software process;

processing the suspicious traffic using the one or more second filters, wherein the one or more second filters are configured to perform an Open Web Application Security Project (OWASP) compliant ruleset based WAF on the suspicious traffic to identify a first portion of the suspicious traffic that is allowed to reach the application; and rejecting, at the one or more second filters, a second portion of the suspicious traffic that is not allowed to reach the application and passing at least the first portion of the suspicious traffic to the application.

11. The one or more non-transitory computer-readable media of claim 10, wherein the first filter is configured to pass a predetermined percentage of the incoming traffic as suspicious traffic to the second filter.

12. The one or more non-transitory computer-readable media of claim 11, wherein the predetermined percentage of suspicious traffic is less than or about 10% of the incoming traffic.

13. The one or more non-transitory computer-readable media of claim 11, wherein the predetermined percentage of suspicious traffic is dynamically adjusted based on a workload of the second filter at runtime.

14. The one or more non-transitory computer-readable media of claim 10, wherein the rules applied by the first filter comprise regular expressions that are used to search the incoming traffic for Structured Query Language (SQL) injections and cross-site scripting attacks.

15. The one or more non-transitory computer-readable media of claim 10, wherein the rules applied by the first filter comprise a pattern, a text description, a matching zone that identifies a portion of an incoming request to which the pattern is applied, and a score.

16. The one or more non-transitory computer-readable media of claim 10, wherein each of the rules applied by the first filter comprises a score, and scores for each rule violation of a request are aggregated and compared to one or more thresholds to determine whether the request is identified as suspicious traffic, allowed traffic, or rejected traffic.

17. A load balancer and firewall comprising:

one or more processors; and one or more memory devices comprising instructions that, when executed by the one or more processors, cause the one or more processors to perform operations comprising:

receiving incoming traffic from one or more client devices at a reverse proxy, wherein the incoming traffic comprises a plurality of requests for an application hosted on a server, and the incoming traffic is received by a Web Application Firewall (WAF) between the one or more client devices and the application;

operating a first filter in the WAF as a layer 7 (application layer) filter to inspect and analyze content of the plurality of requests;

processing the content of the incoming traffic using the first filter in the WAF, wherein the first filter is configured to apply rules that identify suspicious traffic in the incoming traffic;

passing the suspicious traffic from the first filter to one or more second filters in the WAF, and passing at least a portion of the incoming traffic that is not identified as suspicious traffic to the application, wherein the first filter, the one or more second filters, and the reverse proxy are integrated into a single software process, and the first filter provides the one or more second filters with the suspicious traffic within the single software process;

processing the suspicious traffic using the one or more second filters, wherein the one or more second filters are configured to perform an Open Web Application Security Project (OWASP) compliant ruleset based WAF on the suspicious traffic to identify a first portion of the suspicious traffic that may be is allowed to reach the application; and rejecting, at the one or more second filters, a second portion of the suspicious traffic that is not allowed to reach the application and passing at least the first portion of the suspicious traffic that is not rejected to the application.

18. The load balancer and firewall of claim 17, wherein the rules applied by the first filter comprise a plurality of patterns comprising between two and five characters, and combined scores for violations of the plurality of patterns indicate suspicious traffic.

19. The load balancer and firewall of claim 17, wherein the one or more second filters comprises a single filter.

20. The load balancer and firewall of claim 17, wherein the one or more second filters comprises a plurality of additional filters.

21. The load balancer and firewall of claim 17, wherein the first filter is configured to pass allowed traffic to the application, to pass suspicious traffic to the one or more second filters, and to reject traffic that is not received by the one or more second filters or the application.

22. The load balancer and firewall of claim 17, wherein the OWASP compliant ruleset comprises a ModSecurity (MODSEC) process.

* * * * *